(12) United States Patent
Berkobin et al.

(10) Patent No.: US 8,823,502 B2
(45) Date of Patent: Sep. 2, 2014

(54) METHOD AND SYSTEM FOR IMPLEMENTING A GEOFENCE BOUNDARY FOR A TRACKED ASSET

(71) Applicant: HTI IP, LLC, Atlanta, GA (US)

(72) Inventors: Eric C. Berkobin, Woodstock, GA (US); Alex Berkobin, Holly Springs, GA (US); Deep Kalinadhabhotla, Atlanta, GA (US)

(73) Assignee: HTI IP, L.L.C., Atlanta, GA (US)

( * ) Notice: Subject to any disclaimer, the term of this patent is extended or adjusted under 35 U.S.C. 154(b) by 0 days.

(21) Appl. No.: 14/074,604

(22) Filed: Nov. 7, 2013

(65) Prior Publication Data

US 2014/0062730 A1 Mar. 6, 2014

Related U.S. Application Data

(63) Continuation of application No. 12/881,111, filed on Sep. 13, 2010.

(60) Provisional application No. 61/241,680, filed on Sep. 11, 2009.

(51) Int. Cl.
*B60R 25/10* (2013.01)
*G08G 1/00* (2006.01)
*G08G 1/127* (2006.01)

(52) U.S. Cl.
CPC ............. *G08G 1/127* (2013.01); *G08G 1/207* (2013.01)
USPC ............. 340/426.19; 340/426.1; 340/426.18; 340/426.22; 340/539.13; 340/988; 701/408; 701/468; 701/469; 701/300; 701/2

(58) Field of Classification Search
CPC ........ B60R 25/30; B60R 25/31; B60R 25/33; B60R 2325/20; B60R 2325/205; G08G 1/20; H04W 4/21
USPC ............... 340/426.19, 426.1, 426.18, 426.22, 340/539.13, 988; 701/408, 468, 469, 300, 2
See application file for complete search history.

(56) References Cited

U.S. PATENT DOCUMENTS

| | | | |
|---|---|---|---|
| 5,068,656 A | 11/1991 | Sutherland | |
| 5,497,149 A | 3/1996 | Fast | |
| 5,532,690 A | 7/1996 | Hertel | |
| 6,665,613 B2* | 12/2003 | Duvall | 701/485 |
| 6,721,652 B1 | 4/2004 | Sanqunetti | |
| 6,983,302 B1 | 1/2006 | Ohashi | |
| 7,612,668 B2* | 11/2009 | Harvey | 340/550 |
| 8,046,168 B2* | 10/2011 | Wang et al. | 701/469 |
| 2004/0193368 A1* | 9/2004 | Sanqunetti | 701/207 |

(Continued)

*Primary Examiner* — Andrew Bee (57) ABSTRACT

An asset's TCU, or a mobile device coupled thereto, receives and stores geographical boundary definitions to a memory. A processor uses the boundary definition to determine an initial-location boundary based on the definition and the current location of the TCU at the time it received the boundary request message. As the TCU's GPS unit generates location information, the processor retrieves the initial-location boundary definition from the memory and compares the current location from the GPS receiver to it according to an algorithm. If the processor determines that the current location of the vehicle has crossed the boundary, the processor generates an alert message, which may be an e-mail, SMS, telephonic, internet, IM, or other electronic message indicating that an asset crossed the boundary, and sends it wirelessly using a transceiver to a central computer for further processing, or directly to another device, according to a notification destination identifier.

8 Claims, 4 Drawing Sheets

(56) References Cited

U.S. PATENT DOCUMENTS

| | | |
|---|---|---|
| 2006/0176159 A1 | 8/2006 | Chu |
| 2007/0176771 A1* | 8/2007 | Doyle .................... 340/539.13 |
| 2009/0164118 A1* | 6/2009 | Breen ........................ 701/207 |
| 2009/0309709 A1* | 12/2009 | Bevacqua et al. ........ 340/426.18 |
| 2010/0017126 A1* | 1/2010 | Holcman et al. ............... 701/300 |
| 2010/0042940 A1* | 2/2010 | Monday et al. ................ 715/764 |
| 2010/0094500 A1 | 4/2010 | Jin |
| 2010/0148947 A1* | 6/2010 | Morgan et al. ........... 340/426.22 |
| 2010/0277296 A1* | 11/2010 | DeMille .................... 340/426.1 |
| 2010/0279706 A1 | 11/2010 | Dicke |
| 2011/0018759 A1* | 1/2011 | Bennett et al. ............. 342/357.4 |

* cited by examiner

METHOD AND SYSTEM FOR IMPLEMENTING A GEOFENCE BOUNDARY FOR A TRACKED ASSET

CROSS REFERENCE TO RELATED APPLICATIONS

This application is a continuation of, and claims priority under 35 USC sec. 120 to, U.S. patent application Ser. No. 12/881,111, filed Sep. 13, 2010, entitled Method and system for implementing a geofence boundary for a tracked asset, which claims priority under 35 USC sec. 119 to U.S. Provisional Patent Application 61/241,680 having a filing date of Sep. 11, 2009, which applications this application incorporates herein by reference in their entireties.

FIELD

The invention relates to asset tracking, and more particularly to locally determining whether an asset has crossed a geofence boundary.

BACKGROUND

Existing methods and systems for operating a geofence for tracked assets typically use an algorithm that base a definition of a geofence boundary on a predetermined geographical location.

A typical tracking device existing in the art uses a global positioning satellite ("GPS") to determine the current location of the device. A wireless transceiver coupled to the GPS receiver, and GPS processor, transmits information from the GPS processor toward a central computer for processing. The algorithm then compares the current location coordinate of the GPS receiver to predetermined coordinates, or other definition of a geometric shape, such as an equation of a circle centered at a given location predetermined by a user at the central computer, to determine whether the GPS device, and thus what it is fixed to, is bounded by the geometric shape. If not, the central computer may generate a notification that the geometric shape does not bound the GPS device.

While such an approach performs the desired function of generating the notice when a tracked asset leaves the predetermined geographical boundary, for example, the approach also has drawbacks. The drawbacks include excessive power usage and wireless transmission bandwidth usage. To perform a comparison of the current location to the geographical boundary, a system may periodically transmits current location coordinates to the central server, and then the central server performs the comparison and generation of alerts if the comparison indicates that the geographical boundary does not bound the tracked asset. Since each transmission of a data unit, such as a packet, cost money, each periodic transmission of a data unit incurs a cost in air time.

In addition, a person, or organization, that it tracking a particular asset may want to track an asset to determine that it has not moved outside a boundary when the asset is supposed to be turned off. For example, if someone leaves a car parked at an airport, he may want to log on to a web site and determine that his car has not moved from the airport—movement from the airport would indicate a stolen vehicle situation although the user might have permitted service personnel to move the car while at the airport for servicing or maintenance. In such a scenario, upon each periodic transmission of data the wireless transceiver would drain the vehicle's battery by a measurable amount.

Furthermore, in another scenario, a service provider providing roadside assistance in response to an emergency call, distress call, or call for assistance, may have an interest in tracking an asset that it does not own. If a provider dispatches a field unit (i.e., a mechanic in a repair truck, or a tow truck) to provide assistance to a requesting motorist the motorist may either repair the car himself before the field unit arrives, or another responder may arrive first and render aid. In such a situation, the first service provider may end up allocating its resource to the motorist, only to discover upon arrival at the location where the motorist initiated the request for assistance that the motorist has left.

DESCRIPTION

Methods, systems, and apparatuses can utilize GPS capabilities and two-way in-vehicle data communications, typically wireless, between an in-car device and a telematics operations center ("TOC"). The methods, systems, and apparatuses may enable various navigation solutions. The methods, systems, and apparatuses can comprise on-board navigation, off-board navigation, and/or a hybrid navigation approach. On-board navigation can comprise systems that store map data, location data, and can determine routing information in an apparatus installed in a vehicle or handheld. Off-board navigation can comprise systems wherein map data, location data, and routing determination capability is on a remote server, which may forward map data, location data, and determined routes toward an apparatus installed in a vehicle or handheld portable device. A hybrid navigation system can comprise systems that store map and location data on an apparatus installed in a vehicle device, or handheld device, with updates to the map and location data provided by a remote server. In a hybrid navigation system, routing can be performed on the vehicle apparatus, or at the remote server. In one aspect, an apparatus comprising a telematics control unit ("TCU") is installed in a vehicle. Such a vehicle may include, but is not limited to, personal and commercial automobiles, motorcycles, transport vehicles, watercraft, aircraft, and the like. For example, an entire fleet of a vehicle manufacturer's vehicles can be equipped with a TCU 101 shown in FIG. 1. TCU 101 can perform any of the methods disclosed 20*o* herein in part and/or in their entireties.

Figure 1:
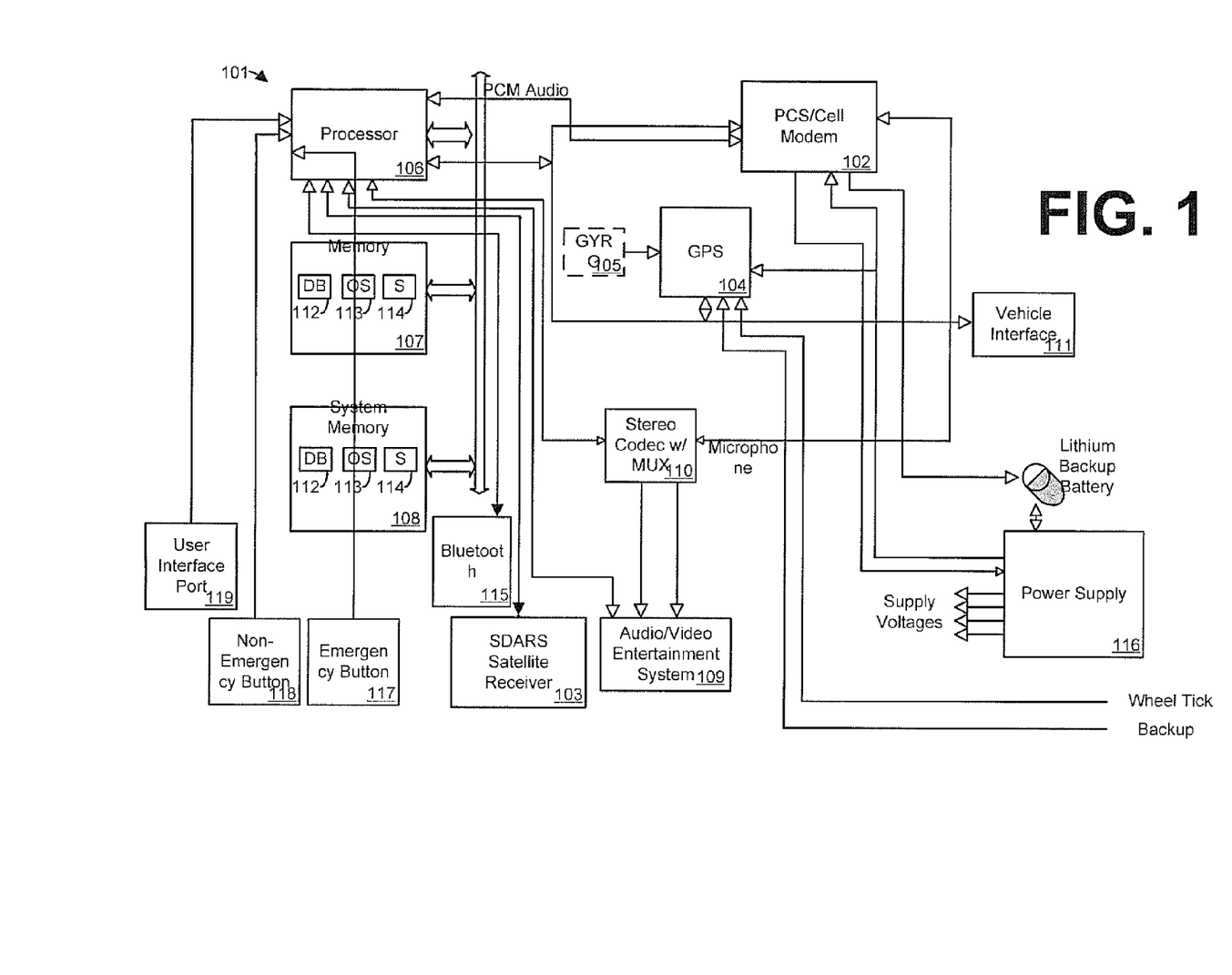
FIG. 1 Illustrates a schematic of an exemplary apparatus.

A single box, or enclosure, may contain components of TCU 101, including a single core processing subsystem, or can comprise components distributed throughout a vehicle. Components of the apparatus can be separate subsystems of the vehicle; for example, a communications component such as a SDARS, or other satellite receiver, can be coupled with an entertainment system of the vehicle.

FIG. 1 illustrates an example of TCU 101, but does not suggest any limitation as to the scope of use or functionality of operating architecture. Neither should the TCU apparatus be necessarily interpreted as having any dependency or requirement relating to any one or combination of components illustrated in the exemplary apparatus. TCU apparatus 101 can comprise one or more communications components. Apparatus 101 illustrates communications components (modules) PCS/Cellular modem 102 and SDARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communication can include, but is not limited to GPRS, EDGE, UMTS, 1xRTT or EV-DO. The PCS/Cell modem 102 can be a Wi-Fi or mobile WIMAX implementation that can support operation on both licensed and unlicensed wireless frequencies. Apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within, or coupled to, apparatus 101. TCU apparatus 101 can request updating, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband implementation that provides a single data stream that is separated into useful and applicable components.

GPS receiver 104 can receive position information from a constellation of satellites operated by the U.S. Department of Defense. Alternatively GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets, and tunnels.

In an aspect, the GPS receiver 104 can activate upon vehicle crank-up, or start of vehicle motion. GPS receiver 104 can go into idle on ignition off, or after ten minutes without vehicle motion. Time to first fix can be <45 s 90% of the time. For example, this can be achieved either through chipset selection or periodic wake-up of a processor in TCU 101.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Data obtained and/or determined by processor 106 can be displayed to a vehicle occupant and/or transmitted to a remote processing center. This transmission can occur over a wired or a wireless network. For example, the transmission can utilize PCS/Cell Modem 102 to transmit the data over a cellular communication network. The data can be routed through the Internet where it can be accessed, displayed and manipulated.

Processing by the disclosed systems and methods can be performed under the control of software components. The disclosed system and method can be described in the general context of computer-executable instructions, such as program modules, being executed by one or more computers or other devices. Generally, program modules comprise computer code, routines, programs, objects, components, data structures, etc. that perform particular tasks; or implement, or manipulate, particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored in memory 107, including by way of example, an operating system 113 and reporting software 114. Each of the operating system 113 and reporting software 114 (or some combination thereof) can comprise elements of the programming and the reporting software 114. Data can also be stored on the memory 107 in database 112. Database 112 can be any of one or more databases known in the art. Examples of such databases comprise, DB2®, Microsoft® Access, Microsoft® SQL Server, Oracle®, mySQL, PostgreSQL, and the like, or any other way, or format, for storing data and information for later retrieval. Database 112 can be centralized, or distributed across multiple systems.

In some aspects, data can be stored and transmitted in loss-less compressed form and the data can be tamper-proof. Non-limiting examples of data that can be collected follow herein. After a connection is established the protocol being used can be stored. A timestamp can be recorded on ignition for one or more trips. Speed every second during the trip. Crash events can be stored (for example, as approximated via OBD II speed). By way of example, GPS related data that can be recorded during one or more trips can comprise one or more of, time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 113 can be a Linux (Unix-like) operating system. One feature of Linux is that it includes a set of "C" programming language functions referred to as "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

Such programs and components may reside at various times in different storage components of the apparatus 101, and may be executed by the processor 106 of apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and reporting software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103 when the vehicle is inactive, and alternately shutting off the PCS/Cell Modem 102 to conserve the vehicle battery when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

TCU apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. TCU 101 may also be integrated into a vehicle and be coupled, either by conductors, fiber cable, or wirelessly, to a vehicle's communication and computer system. A cable can be used to connect the vehicle interface 111 to a vehicle. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO14230-4, ISO15765-4, and the like can be used to collect data through the vehicle interface 111. The vehicle interface 111, allows the apparatus 101 to receive data indicative of vehicle performance, such as vehicle trouble codes, operating temperatures, operating pressures, speed, fuel air mixtures, oil quality, oil and coolant temperatures, wiper and light usage, mileage, break pad conditions, and any other data obtained from any vehicle system, subsystem, or sensor, coupled with the TCU 101, such as over bus using CAN protocol, an ISO protocol, a keyword 2000 protocol, or a similar protocol for interfacing various sensors, modules, and computers in a vehicle with each other. Additionally, CAN interfacing can eliminate individual dedicated inputs to determine, for example, brake usage, backup status, and it can allow reading of onboard sensors in certain vehicle stability control modules providing gyro outputs, steering wheel position, accelerometer forces and the like for determining driving characteristics. TCU apparatus 101 can interface directly with a vehicle subsystem or a sensor, such as, for example, an accelerometer, gyroscope, airbag deployment computer, and the like. Data obtained from, and processed data derived from, the various vehicle systems and sensors can be transmitted to a central monitoring station via the PCS/Cell Modem 102 over a communication network.

Communication with a vehicle driver can be through an infotainment (radio) head unit (not shown), or other display device (also not shown). More than one display device can be used. Examples of display devices include, but are not limited to, a monitor, an LCD (Liquid Crystal Display), a projector, and the like. Audio/video entertainment subsystem 109 can comprise a radio receiver, FM, AM, Satellite, Digital and the like. Audio/video entertainment subsystem 109 can comprise one or more media players. An example of a media player includes, but is not limited to, audio cassettes, compact discs, DVD's, Blu-ray, HD-DVDs, Mini-Discs, flash memory, portable audio players, hard disks, game systems, and the like. Audio/video entertainment subsystem 109 can comprise a user interface for controlling various functions. The user interface can comprise buttons, dials, and/or switches. In certain embodiments, the user interface can comprise a display screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc. . . . ), websites, and the like. Audio/video entertainment subsystem 109 can utilize wired or wireless techniques to communicate to various consumer electronics including, but not limited to, cellular phones, laptops, PDAs, portable audio players, and the like. Audio/video entertainment subsystem 109 can be controlled remotely through, for example, a wireless remote control, voice commands, and the like.

The methods, systems, and apparatuses disclosed herein can utilize power management techniques to ensuring that a consumer's, or motorist's, car battery is not impaired under normal operating conditions. This can include battery backup support when the vehicle is turned off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

TCU apparatus 101 can receive power from power supply 114. The power supply can have many unique features necessary for correct operation within the automotive environment. One mode is to supple a small amount of power (typically less than 100 microamps) to at least one master controller that can control all the other power buses inside of the TCU 101. In an exemplary system, a low power low dropout linear regulator supplies this power to PCS/Cellular modem 102. This provides the static power to maintain internal functions so that it can await external user push-button inputs or await CAN activity via vehicle interface 111. Upon receipt of an external stimulus via either a manual push button or CAN activity, the processor contained within the PCS/Cellular modem 102 can control the power supply 114 to activate other functions within TCU 101, such as GPS 104/GYRO 105, Processor 106/memory 107 and 108, SDARS receiver 103, audio/video entertainment system 109, audio codec mux 110, and any other peripheral within the TCU that does not require standby power.

Processors in a TCU can have a plurality of power supply states. One state can be a state of full power and operation used when the vehicle is operating. Another state can be full power delivery from battery backup. Turning off the GPS and other non-communication related subsystem while operating on the back-up batteries can reduce backup power usage. Another state can be when the vehicle associated with TCU 101 has been shut off recently, perhaps within the last 30 days, and the TCU maintains communication over a two-way wireless network for various auxiliary services like remote door unlocking and location determination messages. After a recent shut down period, it is desirable to conserve charge in the vehicle's battery by turning off almost all power-using portions of TCU 101, except portions used to maintain system time of day clocks, and other functions waiting to be awakened on CAN activity. Additional power states are contemplated, such as a low power wakeup to check for network messages.

Normal operation can comprise, for example, the PCS/Cellular modem 102 waiting for an emergency pushbutton key-press from a user interface device, or for CAN activity. Once either is detected, the PCS/Cellular modem 102 can awaken and enable power supply 114. Similar operation can occur for a shutdown process wherein a first level shutdown process turns off everything except the PCS/Cellular modem 102, for example. The PCS/Cellular modem 102 can maintain wireless network contact during this state of operation. TCU 101 can operate normally in this state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can include a BlueTooth® transceiver 115 that can facilitate interfacing with devices such as phones, headsets, music players, and telematics user interfaces. The apparatus can comprise one or more user inputs, such as emergency button 117 and non-emergency button 118. Emergency button 117 can be coupled to processor 106. The emergency button 117 can be located in a vehicle cockpit and activated an occupant of the vehicle. Activation of the emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to processor 106. Non-emergency buttons 118 can be located in a vehicle cockpit and activated by an occupant of the vehicle. Activation of the one or more non-emergency buttons 118 can cause processor 106 to initiate a voice and data connection from the vehicle to a remote call center. Data such as GPS location and occupant personal information can be transmitted to the call center; a TOC can use this information to retrieve vehicle and motorist information, such as drug allergies or other medical issues particular to a given motorist. The voice connection permits two way voice communications between a vehicle occupant and a call center operator. The call center operator, such as a operator working for a telematics services provider, or working for a roadside assistance operator, can provide location based services to the vehicle occupant based on the data received and the vehicle occupant's desires, as well as the needs of a service provider. For example, a button can provide a vehicle occupant with a link to roadside assistance services such as towing, spare tire changing, refueling, and the like, either directly or through an intermediary call center, such as a telematics service provider or a membership-based roadside assistance provider. In another embodiment, a button can provide a vehicle occupant with concierge-type services, such as local restaurants, their locations, and contact information; local service providers their locations, and contact information; travel related information such as flight and train schedules; and the like.

For any voice communication made through TCU 101, text-to-speech algorithms can be used so as to convey predetermined messages in addition to or in place of a vehicle occupant speaking. This allows for communication when the vehicle occupant is unable or unwilling to communicate vocally.

In an aspect, apparatus 101 can be coupled to a telematics user interface located remote from the apparatus. For example, the telematics user interface can be located in the cockpit of a vehicle in view of vehicle occupants while the apparatus 101 is located under the dashboard, behind a kick panel, in the engine compartment, in the trunk, or generally out of sight of vehicle occupants.

Figure 2:
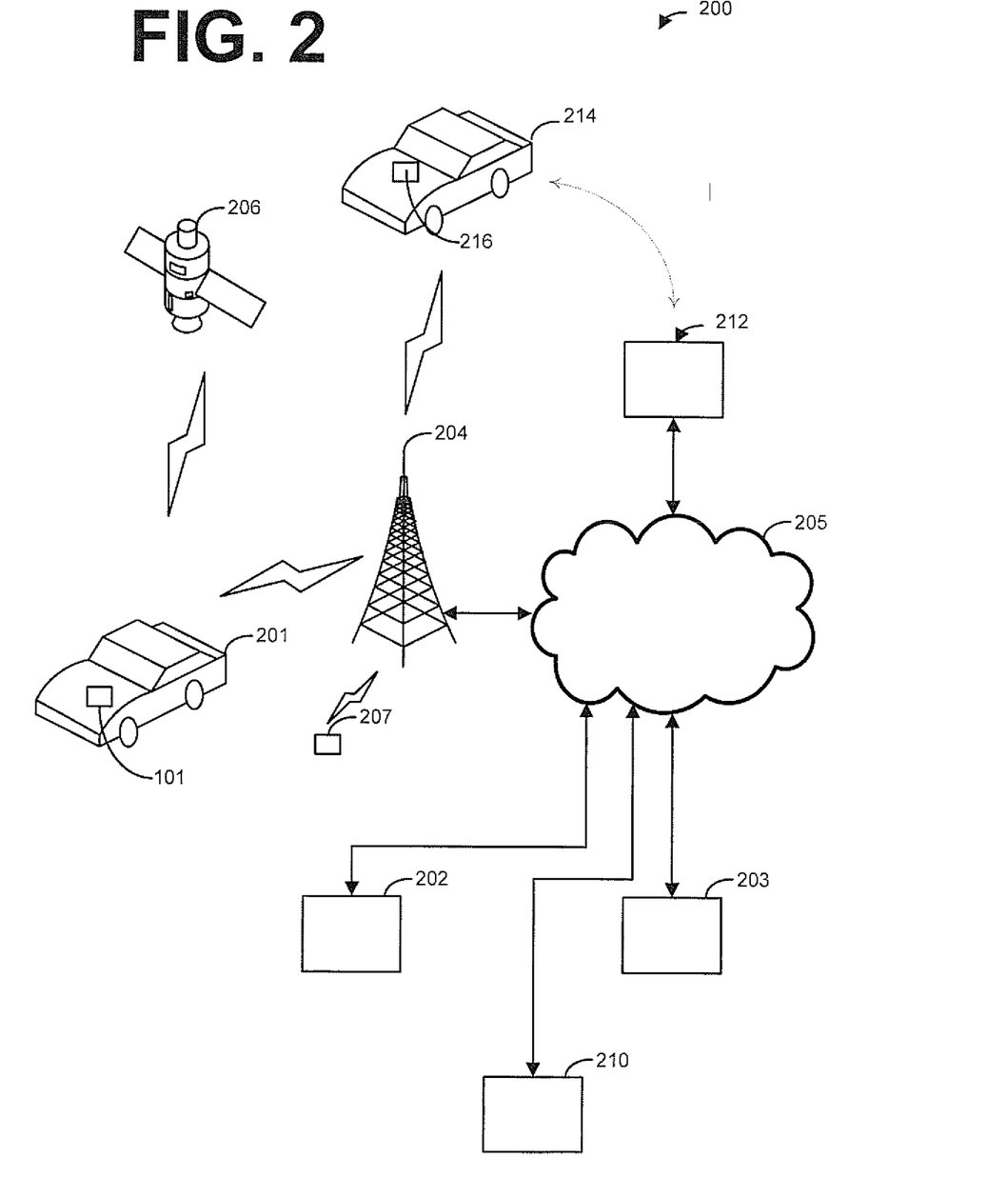
FIG. 2 Illustrates an exemplary system.

FIG. 2 is a block diagram illustrating an exemplary telematics system 200 showing network connectivity between various components. System 200 can comprise a TCU 101 located in a motor vehicle 201 and a mobile communication device 207. Mobile communication device can be a pager, a device having cellular phone circuitry, a PDA, a laptop, and the like. System 200 can comprise a central monitoring station 202. The central monitoring station 202 can serve as a market specific data gatekeeper. That is, users 203 can pull information from specific, multiple or all markets at any given time for immediate analysis. The distributed computing model has no single point of complete system failure, thus minimizing downtime of system 200. In an embodiment, central monitoring station 202 can communicate through an existing communications network (e.g., wireless towers 204 and communications network 205) with the TCU 101 and the mobile communication device 207. In another embodiment, TCU 101 can communicate directly with the mobile communication device 207. System 200 can comprise at least one satellite 206 from which GPS data are determined. These signals can be received by a GPS receiver in the vehicle 201. Station 202 can also include servers for providing telematics services, and for storing telematics-related customer and vehicle information.

System 200 can comprise a plurality of users 203 (governments, corporations, individuals, and the like) which can access the system using a computer, or other computing device, running a commercially available Web browser or client software. For simplicity, FIG. 2 shows only one user 203. Users 203 can connect to the telematics navigation system 200 via the communications network 205. In an embodiment, communications network 205 can comprise the Internet.

Telematics system 200 can comprise a central computer, or monitoring station, 202 which can comprise one or more central monitoring station servers. In some aspects, one or more central monitoring station servers can serve as the "back-bone" (i.e., system processing) of system 200. One skilled in the art will appreciate that telematics system 200 can utilize servers (and databases) physically located on one or more computers and at one or more locations. Central monitoring station server can comprise software code logic that is responsible for handling tasks such as route determination, traffic analysis, map data storage, location data storage, POI data storage, data interpretations, statistics processing, data preparation and compression for output to TCU 101, and interactive route planning, location and POI searching, and the like, for output to users 203. In an embodiment, user 203 can host a server (also referred to as a remote host) that can perform similar functions as a central monitoring station server. In an embodiment of telematics system 200, central monitoring station servers and/or remote host servers, can have access to a repository database which can be a central store for a portion of or all information within telematics system 200 (e.g., executable code, map, location, POI information, subscriber information such as login names, passwords, etc., and vehicle and demographics related data).

In an aspect, central monitoring station 202 can provide updates to TCU 101 including, but not limited to, map updates, POI updates, routing software updates, and the like.

Central monitoring station servers and/or a remote host server can also provide a "front-end" for telematics system 200. That is, a central monitoring 20o station server can comprise a web server for providing a web site which sends out web pages in response to requests from remote browsers (i.e., users 203, or customers of users 203). More specifically, a central monitoring station server and/or a remote host server can provide a graphical user interface (GUI) "front-end" to users 203 of the telematics navigation system 200 in the form of Web pages. These Web pages, when sent to the user PC (or the like), can result in GUI screens being displayed.

Figure 3:
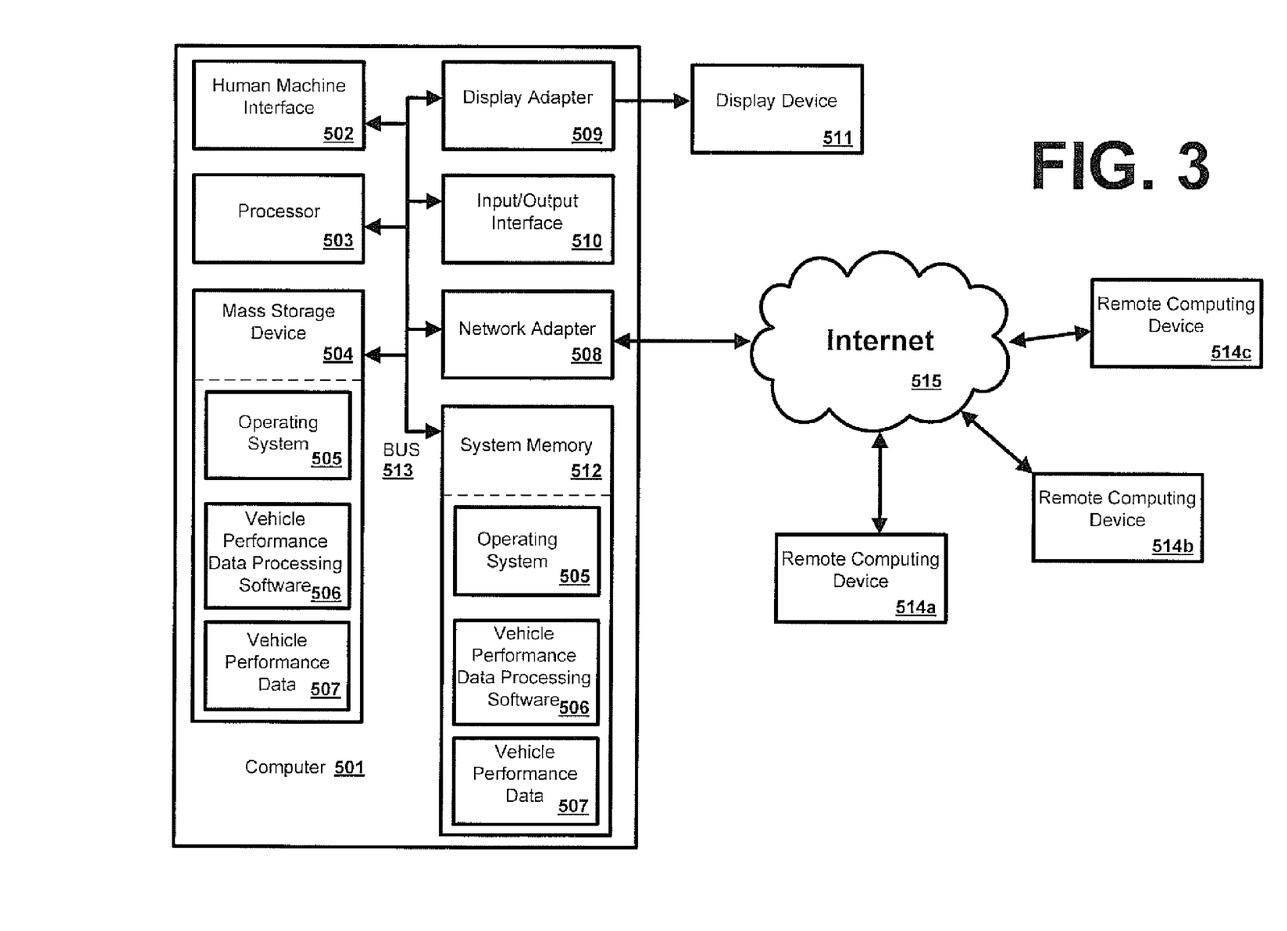
FIG. 3 Illustrates an exemplary operating environment for disclosed methods.

FIG. 3 is a block diagram illustrating an exemplary operating environment for performing the disclosed methods, for example, a server, or other computing device, at a remote host or a central monitoring station. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer device, or computer 501. The components of computer 501 can comprise, but are not limited to, one or more processors or processing units 503, a system memory 512, and a system bus 513 that couples various system components including the processor 503 to the system memory 512.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, PCI-Express bus, Universal Serial Bus (USB), and the like. The bus 513, and all buses specified in this description can also be implemented over a wired or wireless network connection and each of the subsystems, including the processor 503, a mass storage device 504, an operating system 505, navigation software 506, navigation data 507, a network adapter (or communications interface) 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system. In one aspect, a remote computing device can be a TCU.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as navigation data 507 and/or program modules such as operating system 505 and navigation software 506 that are immediately accessible to and/or are presently operated on by the processing unit 503. Navigation data 507 can comprise any data generated by, generated for, received from, or sent to TCU 101.

In another aspect, the computer 501 can also comprise other removable/non-removable, volatile/non-volatile computer storage media. By way of example, FIG. 3 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and navigation software 506. Each of the operating system 505 and navigation software 506 (or some combination thereof) can comprise elements of the programming and the navigation software 506. Navigation data 507 can also be stored on the mass storage device 504. Navigation data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, a haptic interface, and the like. These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like.

The computer 501 can operate in a networked environment using logical connections to one or more remote computing devices 514*a,b,c*. By way of example, a remote computing device can be a personal computer, portable computer, a server, a router, a network computer, a TCU, a PDA, a cellular phone, a "smart" phone, a wireless communications enabled key fob, a peer device or other common network node, and so on. Logical connections between the computer 501 and a remote computing device 514*a,b,c* can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515. In one aspect, the remote computing device 514*a,b,c* can be one or more TCUs 101.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of navigation software 506 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

As used herein in the method descriptions that follow, in certain embodiments, "in-vehicle system" can comprise a system that is installed in a vehicle, either at a factory, dealer, or by the user. In other embodiments, "in-vehicle system" can comprise components and systems that can be used outside of a vehicle. In various embodiments, the in-vehicle system can comprise a telematics device, a navigation system, an infotainment system, combinations thereof, and the like. The "remote host" can be a central monitoring station, or other host that maintains computing and communications systems configured for carrying out the methods.

Rather than periodically transmit the current location of asset 201, or more precisely the current location of the GPS receiver in TCU 101, to the central server 202 so that the server can determine whether a geofence, or geographical boundary, bounds, or surrounds, the vehicle, a method and system reduces airtime used for regularly transmitting data from the tracked asset to the central computer, and also reduces usage of the vehicle's battery. Furthermore, the method and system facilitates the establishing of a boundary based on the current location of the vehicle, or other tracked asset, or an individual, either remotely at a server, or locally at a telematics control unit in an asset, or vehicle. This differs from establishing a predetermined boundary without regard to the current location of the vehicle.

To accomplish these desirable benefits, a central computer, or other computing device, for example a TOC 202, receives a boundary request message from a user. Such a boundary request message may accompany a services request message generated by, or forwarded by, personnel working for an intermediary services provider, such as a motorist's assistance services provider 210 shown in FIG. 2 using a web site. To create the boundary request message, the user 210 may select from a set of predetermined tracking preferences, such as boundary shape, size, and duration.

The preferences may be related to a type of tracking to perform. For example, if a driver of vehicle 201 requests assistance from a roadside assistance service provider 210 in starting his car, the service provider may select a tracking preferences that define a circular boundary surrounding the car centered on the vehicle's current location and having radius of, for example, fifty feet. The selected preferences may also include a duration for the boundary to remain active.

Or, the provider's 210 personnel may simply initiate the sending of a boundary request message to TCU 101 that merely instructs the TCU to initiate a boundary, or geofence, around vehicle 201 using a default boundary shape. Although many default shapes and sizes could be used, a provider would typically default to a circle of a predetermined radius centered at the current location of TCU 101. Various definitions of geofence size, shape, and duration may be transmitted to TCU 101 for storage and later use, or they may be installed in the TCU when its operating software is loaded, or the services provider 210 may transmit a selected geofence definition with the boundary request message.

A geofence may also define a political boundary, in which case using the current location of asset 201 would determine the political boundary to use as the geofence boundary that surrounds vehicle, or other asset.

Upon receipt of the boundary request message at TCU 101, the TCU determines its current location, preferably from its GPS portion, or alternatively using its cellular telephony circuitry to triangulate is location, and establishes a geofence around itself based on the current location and the desired shape, whether a default, or other selected shape.

Initiating a boundary message for either a default shape, or a selected shape, by service provider 210 causes a central computer 202 to send a boundary identifier and a notification destination identifier in a boundary request message to TCU 101, which is associated with asset 201, or the vehicle, requesting assistance. The telematics control unit 101 receives the boundary request message and extracts the identifier from it. TCU 101 may then lookup from its memory a boundary definition corresponding to the boundary identifier. The boundary definition may include an equation for a selected shape, for example a circle. Or, the definition may comprise a set of coordinates that define a particular polygonal shape. After establishing the boundary definition based on the current GPS coordinates of the vehicle, the TCU can send out an alert message according to the notification destination identifier when it leaves the boundary. Examples of the notification destination identifier include an e-mail address, an SMS number, a telephone number, a internet address, an internet uniform resources locator ("URL"), or other such electronic identifier used for identifying destination of an electronic communication message.

In the roadside assistance scenario, the notification destination identifier could be associated with the field services entity 212 providing the roadside assistance, for example a wrecker service, and the alert could serve as a notice to the service provider 212 that a motorist has successfully started his car and no longer needs the provider's services. In another embodiment, the notification destination identifier could be associated with the intermediary operator 210, which would receive an alert and then contact services provider 212 that it had received the alert. Or, a notification destination identifier could include identifiers associated with both providers 210, and, 212, so that they both receive boundary breach, or alert, message when vehicle 201 leaves the initial-location boundary geofence.

Based on the notice, service provider 212 can redeploy an asset 214, such as a tow truck, mobile mechanic, fuel truck, etc. Thus, the provider avoids a wasted trip of its personnel to the site of the requesting motorist who discovers the motorist has left and no longer needs assistance in starting his car. In redeploying asset 214, the provider 212, and provider 210, assume that the operator of vehicle 201 no longer needs assistance, but did not notify either of the providers 210, or 214 that he had left the location where he placed the initial request for assistance from. However, services provider 210, who typically has a commercial relationship with the operator of vehicle 201, may contact that operator to confirm that he no longer needs assistance. Service provider 212 may communicate with vehicle 214, which may be one in a fleet of vehicles, or assets, via a TCU 216 similar to TCU 101 in vehicle 201.

Figure 4:
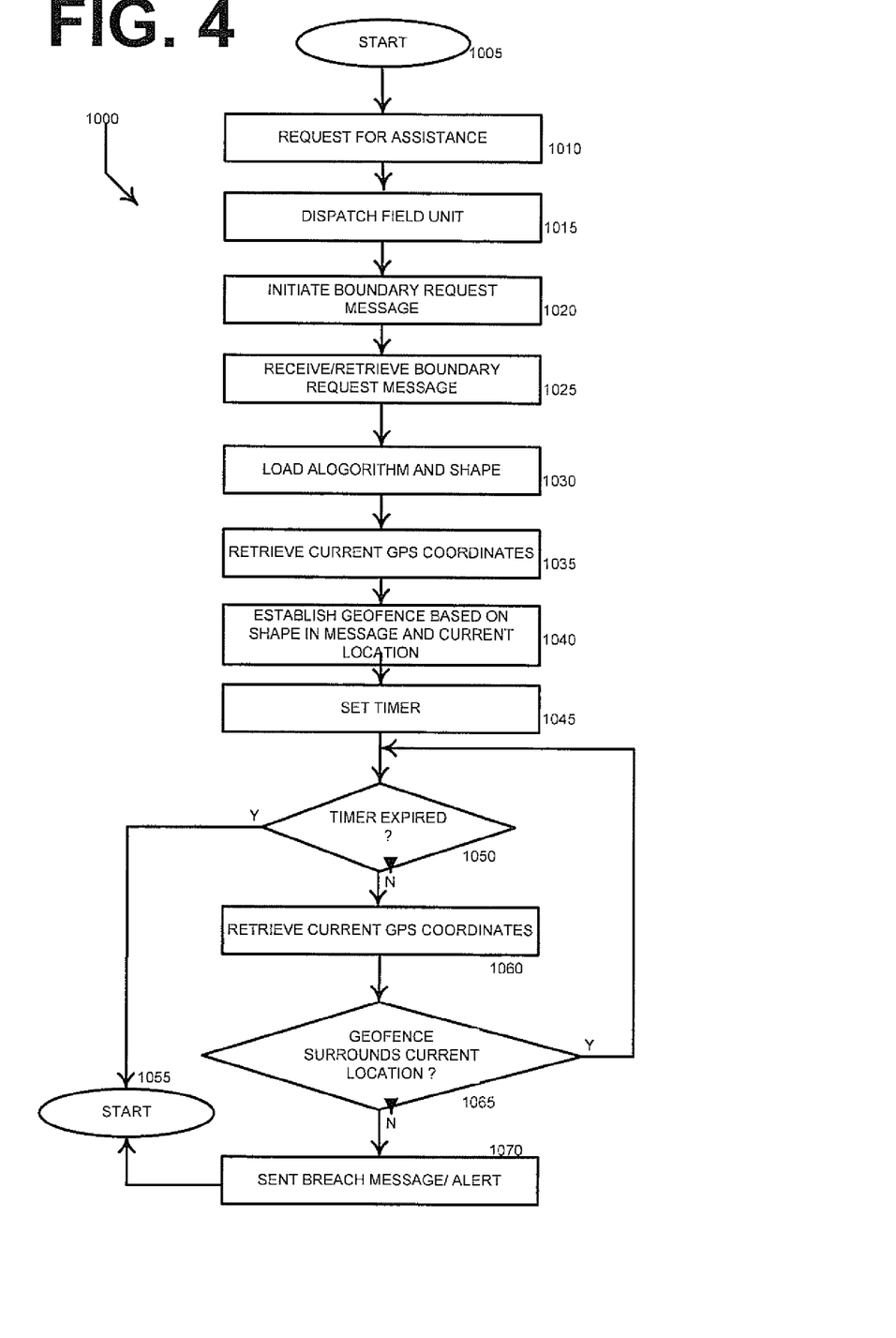
FIG. 4 illustrates a flow diagram for a method for operating a geofence boundary around a vehicle's present location.

Turning now to FIG. 4, the figure illustrates a flow diagram for a method 1000 for notifying when an asset moves outside a boundary. Method 1000 starts at step 1005. A motorist makes a request for assistance at step 1010, by either calling an intermediary call center operator, or pressing a button in the motorist's car (or asset) that sends a request message to an intermediary operator. A TCU can also generate a request if a sensor on the asset provides information to the TCU processor that the motorist needs assistance. The processor can determine the need for assistance based on a change in one or more characteristics of the motorists car, such as, for example, air bag deployment, or a fuel level gage indicates the fuel tank is empty and the car's engine stopped running.

An operator for an intermediary entity, a telematics services operator, a motorist's club services operator, a telephone services operator, or an emergency call operator, for examples, may receive a motorist's assistance request message and forward the request to an appropriate services provider. For example, if an air bag deploys, the appropriate provider may be ambulance and police responders. Or, if a car runs out of gas, or loses tire pressure suddenly, the appropriate provider may be a roadside assistance provider. Typically, an operator working for an intermediary call center service provider receives an initial call, or transmission, from a motorist who needs assistances. Intermediary call center personnel, or automated equipment thereof, formulates a service request and forwards the request to an operator for, or automated equipment of, a field service provider, such as a wrecker service, an ambulance service, law enforcement personnel, or a roadside assistance service. The field service provider dispatches appropriate personnel and equipment according to the nature of the motorist's need based on the formulated request from the intermediary operator.

After the appropriate field service provider receives the assistance request, it dispatches a field service unit to render service to the requesting motorist at step 1015. The intermediate operator also initiates and sends a boundary request message at step 1020 to the TCU that sent the request for assistance message. At step 1025, the TCU receives the boundary request message. In addition to forwarding the service request to a services provider, the intermediary operator, or automated equipment thereof, such as a computer server at a telecommunication operating center ("TOC"), may send a notification destination identifier in the boundary request message to the asset's TCU.

Upon receiving the boundary request message the TCU may set a flag in its processor, or memory, to establish a geofence boundary based on a boundary definition, which the TCU may already contain, or the boundary request message itself may contain a boundary definition for the TCU to use. Upon setting the flag and retrieving, or retrieving, the boundary definition to use, the TCU loads the boundary definition into its active memory at step 1030. At step 1035, the TCU obtains its current location, preferably from a GPS circuit that is integrated with, or coupled to, the TCU processor. Typically, the location information received from the GPS circuit comprises geographical coordinates. At step 1040, the TCU uses the boundary definition loaded in its active memory and the current location coordinate(s) retrieved from the GPS circuit at step 1035, and determines an initial-location boundary. The TCU loads an expression representing the initial-location boundary into its active memory, or processor, and may begin a timer at step 1045.

At step 1050, the processor determines whether the timer has expired. If so, method 1000 ends at step 1055. If the timer has not expired, method 1000 advances from step 1050 to step 1060 and the TCU processor retrieves the current location coordinates from the GPS circuit coupled to it. At step 1065, the TCU processor compares the current location coordinates to the initial-location boundary according to an appropriate corresponding to the boundary definition loaded in memory, or in the processor. For example, if the initial-location boundary is a circle of 50 foot radius centered at the location of the TCU at the time it received the boundary request message at step 1020, the TCU processor can use a simple mathematical formulas, for example, the Pythagorean Theorem, to determine whether the distance between the location at step 1020 and the current location is greater than 50 feet. Actually, the coordinates used to establish the initial-location boundary are those retrieved from the GPS circuit at step 1035, but the time between execution of step 1020 and step 1035 will typically be small compared to the period between location information updates generated by the GPS circuit.

If the TCU processor determines at step 1065 that the initial-location boundary, or 'geofence', surrounds the current location retrieved at step 1060, method 1000 returns to step 1050 and proceeds as discussed above. One will appreciate that the timer could be a timer operated for a certain period of time, or clock cycles, or the timer could also be a predetermined number of retrievals from the GPS circuit (a predetermined number of executions of step 1065). In addition, the timer could be set with a high value so that method 1000 monitors whether the initial-location boundary surrounds the vehicle for a long time—weeks, or months, for example.

If the processor determines at step 1065 that the initial-location boundary does not surround the current location of the TCU retrieved during the most recent execution of step 1060, then method 1000 advances to step 1070.

At step 1070, the TCU generates a breach notification message, boundary crossing notification message, or alert, and wirelessly transmits it toward the services provider, or other entity, associated with a notification destination identifier that may be located in the boundary request message. An alert may be a message that causes an affirmative act to occur, such as illuminate a light, or icon on a screen, or generate an audible message. Or, the breach notification may merely be in the form of a message that is available to a user, but does not foist itself on the user in the form of overt action. The breach, or crossing, notification message may be an e-mail, SMS, telephonic, internet, IM, or other electronic message providing information to the service provider that the geographical boundary no longer surrounds the tracked asset. The notification destination identifier may be a telephone number, an internet address, an internet uniform resource locator ("URL"), an SMS number/identifier, an e-mail address, or a screen name. The services provider can then decide how to act on the information contained in the breach notification message. For example, the services provider could send a recall message to the field service unit instructing the driver thereof to return to its base location, or to communicate with the base location to receive updated work orders. In response to receiving the alert, the services provider may also attempt to communicate with the motorist, or the TCU in the vehicle, or asset, to confirm that the motorist no longer needs service. After a breach notification message has been transmitted, method 1000 ends at step 1055.

In another aspect, the tracked asset may be an individual, or, a device associated with, and generally local to, an individual. The program that processes the current location of the tracked asset, or individual, may be running on a device such as a smart phone, or a cell phone. This may be referred to as the tracking application device. The tracking application device may include accelerometers, a gyroscope, a GPS module, a long range wireless transceiver (e.g., a cellular phone modem) and a short range wireless transceiver (e.g. Bluetooth).

In an automobile, or other vehicle, scenario, a TCU 101 may be distributed between multiple devices. For example, a dongle (which for purposes of discussion may be referred to as fixed with respect to the vehicle) that couples with vehicle interface 111 may include accelerometers, a gyroscope, a GPS module, a long range wireless transceiver (e.g., a cellular phone modem) a short range wireless transceiver (e.g. Bluetooth). It too may have capabilities similar to a tracking application device.

However, a mobile tracking application device, such as a smart phone or cell phone, may come close (i.e., the short range wireless transceivers are within range of one another) to the fixed dongle. The mobile device may be running an application that performs tracking and reporting when it leaves a geofence, To conserve battery life of the mobile tracking application device, a processor in it may cause the GPS module in it to enter a sleep mode, and the application running in the mobile application tracking device could then use GPS location information received from the fixed dongle via a wireless link between its short range wireless transceiver and the short range wireless transceiver of the fixed dongle to determine whether it is within or without a geofence boundary defined in a received geofence definition, which could be received at the dongle and transferred to the mobile device/smart phone, or received by the mobile device itself.

The application running on the mobile tracking application device could also detect when it leaves the presence of the fixed dongle of the vehicle, and then control how it uses its internal GPS module/circuitry. For example, when the smart phone leaves range of the short range wireless link, it can cause the internal GPS module to exit sleep mode and generate current location information, which the application running on the mobile tracking application could then receive and use to determine whether it is within a given geofence or not. To conserve battery power, the application could then instruct the processor of the mobile device to cause the internal GPS module to enter sleep mode again if the location has not changed more than a predetermined amount during a predetermined period. The mobile device could then monitor other signals, such as for example, timing signals from cell phone towers, or the like. In addition, the application running on the smartphone, or similar mobile device, may use detected wifi signals to compare to a database to determine its location. Using, for example, wifi and cell tower signals to determine location consumes significantly less power than does a typical GPS module. Therefore, if processing of the location information from the wifi, cell tower, or other similar signals, does not indicate that the smart phone, or other device running a tracking application, or geofence application, then its GPS module may remain in sleep mode. By periodically checking the current location, and comparing to the location determined at a previous iteration, typically the most recent iteration, the mobile device can determine when to cause its GPS module to exit sleep mode and thus obtain higher accuracy and precision of location information that GPS system can provide vis-à-vis using signals from cell towers or wifi network.

Thus, when coupled via a short range wireless link to a fixed device, such as a dongle, permanent TCU device, or other device in a vehicle that has a GPS module, a mobile device running a geofence/tracking application can take advantage of the power source of the vehicle and use GPS location information as the vehicle moves. When the mobile device moves out of short range wireless signal range of the fixed dongle, the geofence/tracking application can rely on location information from the internal GPS of the mobile device while it is moving, but cause the internal GPS module to sleep while the device is not moving, and periodically query cell tower signals, wifi signals, and the like to determine whether it has started moving again and thus cause the internal GPS module to awaken to take advantage of the GPS accuracy. The mobile device can send alerts when it crosses into or out of a geofence via a long range wireless link to a TOC server, to another mobile device, to an e-mail address, to a telephone number, to a MAC address, or other similar form for sending messages electronically.

In another aspect, a geofence/tracking application running on TCU 101 coupled to the vehicle (either dongle, permanent, mobile device, or other) can determine whether a particular cell phone, or other mobile device, is in its presence. Based on a predetermined authentication schedule and protocol, if a first mobile device is in the presence of TCU 101, then the TCU may generate and transmit alerts when it crosses a geofence boundary, either crossing into our out from an area surrounded by the boundary. If, however, a second, or other, mobile device is in the presence of TCU 101, it may not generate a geofence crossing alert. Alternatively, the presence of a preferred mobile device may suppress transmitting of an alert, but the TCU may transmit geofence crossing alerts in the absence of the preferred mobile device.

In another embodiment, instead of transmitting alerts, the presence of a preferred mobile device with respect to a TCU 101 may facilitate authentication with the TCU that enables functions such as door unlock, engine start/stop, and other vehicle control functions. Alternatively, TCU 101 may be programmed to prevent such vehicle control functions if a preferred mobile device is within range of a short range wireless link between the mobile device and TCU. The facilitating or preventing of such remote vehicle functionality may be associated with a geofence so that such functionally may, or may not, occur based on the location of the TCU with respect to the geofence boundaries.

In another aspect, a mobile device may include accelerometers, or an accelerometer module, such as a three-axis accelerometer module mounted on a circuit board. A processor in the mobile device may cause a GPS module internal to it (the mobile device) to enter a sleep mode if an application running on the mobile device determines that the mobile device is not moving. Signals from the accelerometer may be used as a trigger to wake up a GPS module in sleep mode, or may be used to adjust a rate at which the GPS module of a mobile device attempts to lock to GPS signals. For example, signals from an accelerometer may be conditioned (e.g., averaged, evaluate square root of the sum of the squares, or other functions) and compared to a predetermined threshold. If the conditioned value of the accelerometer signals exceeds a trigger threshold, then the mobile device processor causes the GPS module internal to it to wake up. If awake, the conditioned GPS signal can be used to determine that the mobile device is moving at a speed faster than a predetermined rate, and increase the rate at which the mobile device attempts to lock to GPS signals according to the rate of motion of the device.

The processing of the disclosed methods and systems can be performed by software components. The disclosed system and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:
1. A system, comprising:
 a telematics device located in a vehicle;
 a tracking application associated with the vehicle, wherein the tracking application defines a geofence;
 one or more wireless mobile devices associated with the telematics device; and wherein the tracking application is configured: to generate an alert message when the telematics device crosses the geofence if one of the one or more wireless mobile devices is not in the presence of the telematics device, and to suppress generating an alert message when the telematics device crosses the geofence if one of the one or more wireless mobile devices is in the presence of the telematics device.

2. The system of claim 1 wherein the tracking application is running on the telematics device.

3. The system of claim 1 wherein the tracking application is running on a server remote from the vehicle.

4. The system of claim 1 wherein the tracking application is running on one of the one or more wireless devices associated with the telematics device.

5. The system of claim 2 wherein the tracking application generates the boundary in response to a wirelessly received boundary request message.

6. A tracking application running on a first device configured to perform a method, the steps of the method comprising:
   associating the first device with a vehicle;
   wherein the first device is in the vehicle;
   defining a geofence associated with the vehicle;
   associating one or more wireless mobile devices with the first device;
   generating an alert message when the first device crosses the geofence if one of the one or more wireless mobile devices is not in the presence of the first device; and
   suppressing the generation of an alert message when the first device crosses the geofence if one of the one or more wireless mobile devices is in the presence of the first device.

7. The tracking application, of claim 6 wherein the tracking application generates the boundary in response i:o a wirelessly received boundary request message.

8. A server device configured to perform a method, the steps of the method comprising:
   associating a telematics device with a vehicle;
   defining a geofence associated with the vehicle;
   associating one or more wireless mobile devices with the vehicle;
   generating an alert message when the telematics device crosses the geofence if one of the one or more wireless mobile devices is not in the presence of the telematics device; and
   suppressing the generation of an alert message when the telematics device crosses the geofence if one of the one or more wireless mobile devices is in the presence of the telematics device.

\* \* \* \* \*